(12) United States Patent
Bravet et al.

(10) Patent No.: US 6,265,054 B1
(45) Date of Patent: Jul. 24, 2001

(54) COMPOSITE GLAZING MATERIAL MADE OF GLASS AND PLASTIC AND PROCESS FOR DETERMINING THE OPTIMAL GEOMETRIC PARAMETERS OF THIS GLAZING MATERIAL

(75) Inventors: Jean-Louis Bravet, Thourotte; Bernard Bureau, Marqueglise; Claude Morin, Puteaux; Christian Padoy, Gonesse; Boris Vidal, Giraumont, all of (FR)

(73) Assignee: Saint-Gobain Vitrage, Courbevoie (FR)

( * ) Notice: Subject to any disclaimer, the term of this patent is extended or adjusted under 35 U.S.C. 154(b) by 0 days.

(21) Appl. No.: 08/882,439

(22) Filed: Jun. 25, 1997

(30) Foreign Application Priority Data

Jun. 25, 1996 (FR) .................................................. 96 07860
Feb. 18, 1997 (FR) .................................................. 97 01893

(51) Int. Cl.⁷ ............................... B32B 7/10; B32B 17/10
(52) U.S. Cl. ......................... 428/213; 156/102; 156/104; 156/106; 428/214; 428/215; 428/412; 428/425.6; 428/430; 428/441; 428/442

(58) Field of Search .................................... 428/213, 214, 428/215, 425.6, 430, 441, 442; 156/102, 104, 106

(56) References Cited

U.S. PATENT DOCUMENTS 5,763,062 * 6/1998 Smith et al. ......................... 428/215

* cited by examiner

Primary Examiner—D. S. Nakarani
(74) Attorney, Agent, or Firm—Scully, Scott, Murphy & Presser

(57) ABSTRACT

The invention relates to a composite glazing material of the type including two sheets of glass and an interlayer of transparent plastic of greater thickness than the thickness of the sheets of glass, characterized in that the plastic is capable of adhering to the glass.

The glazing material has a total thickness smaller than 5 mm, a ratio of the thickness of the interlayer to the thickness of the sheets of glass of between 1 and 10, a mass per unit area lower than 6 kg/m² and a Young's modulus higher than 30 GPa at a total thickness of glazing material of 3 mm.

16 Claims, 2 Drawing Sheets

COMPOSITE GLAZING MATERIAL MADE OF GLASS AND PLASTIC AND PROCESS FOR DETERMINING THE OPTIMAL GEOMETRIC PARAMETERS OF THIS GLAZING MATERIAL

The present invention relates to a composite glazing material made of glass and plastic, usable especially in the automobile industry for producing windshields and side windowpanes.

It is known that glazing materials for automobile vehicles must have at the same time good optical properties, such as transparency and nonscratchability and good mechanical properties such as the resistance to impacts and a low weight.

A composite glazing material according to the preamble of claim 1 is known from Patent WO 96/12604. However, because of their very small thickness, the glass layers employed are incapable of giving the glazing material the resistance to impacts and the flexural rigidity which are required by glazing materials for automobile vehicles. The only part played by the glass layers is that of protecting the plastic interlayer against scratches.

U.S. Pat. No. 4,600,640 relates to a composite glazing material made up of a layer of polycarbonate, of an adhesive layer and of a thin sheet of glass which has a thickness of the order of 0.1 mm. Here too the objective sought after is that of protecting the layer of plastic against scratches. The glazing material is therefore not suitable for producing windshields of automobile vehicles. In addition, this patent gives no information on the thickness of the adhesive layer. And yet, the adhesive layer runs the risk of appreciably perturbing the rigidity, all the more so since, as the coefficient of expansion of the glass is seven times smaller than that of the polycarbonate, a considerable thickness of adhesive, capable of taking up the differences in expansion, would have to be employed, and this adhesive of considerable thickness will impair the rigidity of the glazing material and its mechanical performance characteristics.

Patent GB 1 184 042, for its part, also describes a composite glazing material including two extremely thin layers of glass which have an antiscratch function. These glass layers are incapable of imparting the least rigidity to the glazing material.

Patents CH 427 234 and DE 94 03 934 both relate to a composite glazing material which has two glass layers markedly thicker than in the preceding glazing materials, but here too there is no search for mechanical performance.

The present invention aims to remedy the disadvantages of the glazing materials of the prior art and its subject matter is therefore a glass and plastic composite glazing material which has good mechanical performance characteristics such as a good flexural strength and a low mass per unit area.

To this end the invention relates to a composite glazing material according to the characterizing part of claim 1.

In the glazing material according to the invention the glass sheets are sufficiently thick to create, on association with the plastic, a beam effect which gives the glazing material a good flexural strength.

Another subject matter of the invention is a composite glazing material such that, when the glass sheets break up following an impact, the glass debris remain adhesively bonded to the plastic interlayer and do not escape from the glazing flange in which the glazing material is secured. The glazing material will thus be able to retain its rigidity and prevent the passengers from being ejected through it.

To facilitate or strengthen the adhesion of the plastic to the glass sheets it is possible to employ an adhesiveness promoter which is deposited onto the glass or introduced into the plastic.

Experience has shown that the adhesion between glass and plastic must be such that the resistance to tearing out is at least 20 N/cm for a strip 1 cm in width. In some cases this resistance can be obtained without any adhesiveness promoter; in other cases an adhesiveness promoter deposited on the glass and/or introduced into the plastic will be resorted to.

The invention also relates, by way of new industrial product, to units incorporating the glazing material described above, for example bodywork units, such as tailgates or panels including a transparent zone consisting of a glazing material according to the invention and zones which are not necessarily transparent, painted or raw from demolding, made from the same plastic as that forming part of the composition of the glazing material or from another plastic and optionally possessing other properties, especially transparency and optionally greater rigidity. These other zones external to the glazing material zone may be produced during the same molding operation that allows the glazing material to be manufactured, and in the same mold, or, on the contrary, a two-step molding operation may be involved, either in the same mold or by reprocessing in a second mold.

It is also possible to produce a unit including essentially the glazing material, the latter being simply equipped at its periphery with rims, of a frame particularly thus forming a glazing material which is encapsulated, or various appendages.

These components can be made of injection-molded plastic, but can also include additions or inserts, such as embellishers, accessories intended to fulfill various functions (optical signaling block, third stoplight combined with the rear window of the vehicle, passages for electric cables, piping especially for a window-washer, profiled component for improving the aerodynamics, lock housing, and the like).

Before the injection molding of the plastic the inserts are placed between the two glass sheets and the additions with their projecting appendages are received in housings provided for this purpose in the mold. The inserts and appendages will thus be incorporated into the bulk of the glazing material or of the unit comprising a transparent zone forming a glazing material without there being any need to drill through or to machine the glazing material.

The present invention also relates to a process which makes it possible to determine the optimal geometric parameters of the composite glazing material in order that it may have a minimum mass per unit area while retaining a good mechanical behavior with regard to impacts.

It is known, in fact, that the trend is to restrict the emissions of polluting gases and consequently to design components that are lightened in weight. It has been found, in fact, that a 1% lightening in the weight of the vehicle reduces the emission of carbon dioxide by 0.3%, everything else being otherwise equal. This trend also applies to glazing materials.

However, the search for a lightening in the weight of the glazing material at any cost can be accompanied by a deterioration in its flexural rigidity and consequently can entail a decrease in the rigidity of the vehicle.

It is found, in fact, that purely and simply replacing sheets of glass with sheets of polymers of low weight, such as polycarbonates, methacrylates, polyethylene ionomers or polyurethanes, with retention of a sufficient rigidity to meet the criteria of good mechanical behavior on impacts, is not reflected in a lightening in weight. This is due to the fact that the saving in the specific mass of the plastics (which is of the order of half that of the glass) is more than compensated for by the loss in Young's modulus of these plastics.

The Applicant Company has been interested in the problem of the systematic investigation of glass and plastic composite glazing materials with a view to determining those which have the smallest mass per unit area at a given flexural rigidity.

Where glazing material for the automobile industry is concerned, there is already known the composite glazing material including an interlayer thickness of polyvinylbutyral (PVB) included between two sheets of glass. However, it has been found that, to obtain a satisfactory flexural rigidity with such a glazing material, it is necessary to employ a very large thickness of PVB, and this, despite the low specific weight of this material, results in a glazing material that is markedly heavier than a glazing material made of monolithic glass which has the same flexural rigidity. This is due to the fact that, because of its low compression modulus, the PVB interlayer is crushed when the glazing material is flexed and that the beam effect imparted by the interlayer plays only a very small part.

It is necessary therefore first of all to determine the plastics capable of being used for the production of an interlayer in a composite glazing material and to determine, for each of these plastics, the thickness of material to be introduced between the two sheets of glass and the optimum thickness of the latter in order to obtain the lowest mass per unit area at constant flexural rigidity.

The Applicant Company has discovered that the plastics which ought to make it possible to obtain a mass of composite glazing material which is smaller than those of monolithic glass are those which have a Young's modulus equal to at least 20 MPa, for example that belonging to the polyethylene ionomer, polycarbonate and polyurethane group.

A subject matter of the invention is therefore a process for determining the geometric parameters of the composite glazing material according to claim 6.

The minima [sic] standing out on the curve corresponds to the optimum geometry of the glazing material, in terms of mass per unit area. The thickness of the glass sheets of this glazing material is read off at the minima [sic] point of the curve.

An advantageous value of said reference thickness of the monolithic glass sheet is 3 mm, which is the standard thickness of the glazing materials of automobile vehicles.

The curve of variation in the mass per unit area as a function of the glass thickness can be plotted in the same way for each plastic selected, in the same conditions as above. It is found that the optimum configuration varies slightly from one plastic to another.

The invention will now be described with regard to the appended drawings, in which.

The laminated glazing material according to the invention, not shown, is made up of two flat sheets of glass including between them an interlayer made of a transparent plastic. The ratio of the thickness of the interlayer to that of the sheets of glass is between 1 and at least 5, or even 1 and 10.

The interlayer may consist of any transparent thermoplastic that adheres to glass, for example of an ionomer resin such as a copolymer of methacrylic acid and of polyethylene [sic] or a copolymer of acrylic acid and of ethylene, neutralized with a polyamine. It may also consist of polyurethane, of thermoplastic polyurethane, of RIM polyurethane, of polyethylene terephthalate, of a polyester or of an acrylic or modified acrylic resin or an association of several thicknesses of the same one or of several of these plastics.

In its particular application to glazing materials for automobile vehicles, the glazing material according to the invention will preferably need to have a maximum total thickness of 5 mm, which is the standard thickness of the housing provided for this purpose in vehicle doors. The thickness of each sheet of glass is smaller than 1.5 mm and preferably smaller than 1.2 mm and the Young's modulus of a glazing material of 3 mm total thickness is higher than 30 GPa.

The process which has made it possible to determine the abovementioned geometric and mechanical parameters will now be explained.

Figure 1:
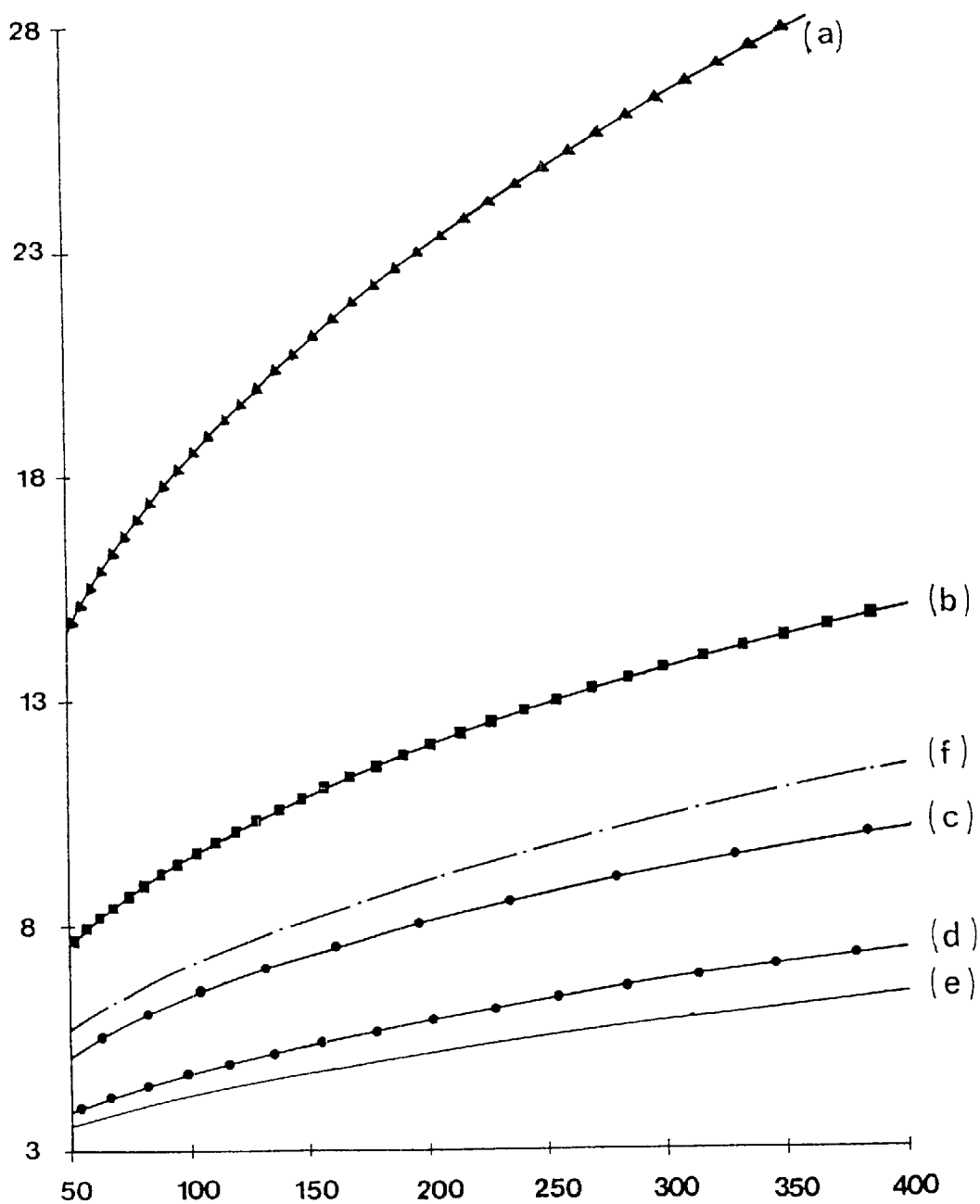
FIG. 1 represents a graph showing the change in the mass per unit area of monolithic and composite glazing materials made of a certain number of materials, as a function of the flexural rigidity of these glazing materials.

With reference to FIG. 1, curves a, b and c represent respectively the flexural rigidity of a monolithic sheet of polyethylene ionomer, of a monolithic sheet of polycarbonate and of a monolithic sheet of glass.

It is seen from these curves that, to obtain a given flexural rigidity, monolithic sheets of polyethylene ionomer and of polycarbonate must be employed which have respective masses per unit area that are much greater than that of the sheet of glass which has the same flexural rigidity. For example, in the case of a flexural rigidity of 200 N m, the masses per unit area are the following: 8 kg/m$^2$ for glass, 23 kg/m$^2$ for the ionomer polymer and 11.5 kg/m$^2$ for the polycarbonate.

The ionomer polymer and the polycarbonate are merely two examples of plastics which have a good resistance to mechanical impacts. In general, plastics which have this property and which can be employed within the scope of the present invention are those which have a Young's modulus of at least 20 MPa.

The Applicant Company has shown that by employing these materials as interlayer in a composite glazing material it is possible to obtain glazing materials which have a mass per unit area that is smaller than that of the glazing materials made of a monolithic glass sheet, at constant flexural rigidity.

Also shown in FIG. 1 are the curves d and e of variation in the mass per unit area of composite glazing materials made up of two sheets of monolithic glass, each 0.5 mm in thickness, including between them, respectively, a layer of polycarbonate and a layer of polyethylene ionomer. The Young's moduli of these two materials have the values of 80 and 160 MPa respectively.

It is seen that curves d and e are underneath curve c, which means that, at constant flexural rigidity, the composite glazing materials with an interlayer made of polycarbonate and of polyethylene ionomer are lighter than a glazing material made of monolithic glass. Thus, in the case of the flexural rigidity chosen above, 200 N m, the masses per unit area corresponding to the cases of curves d and e are 5.8 and 5.1 kg/m$^2$ respectively, and therefore much lower than that of the monolithic glass sheet.

Also shown in FIG. 1 is the curve f showing the change in the mass per unit area of a composite glazing material made up of a PVB interlayer of 0.76 mm thickness and of two glass sheets, as a function of the glass thickness, this being at a flexural rigidity which is constant and equivalent to that of a 3 mm monolithic glass. It is seen that this curve is situated entirely above curve c. PVB therefore does not make it possible to obtain a lightening in weight of the glazing material.

Figure 2:
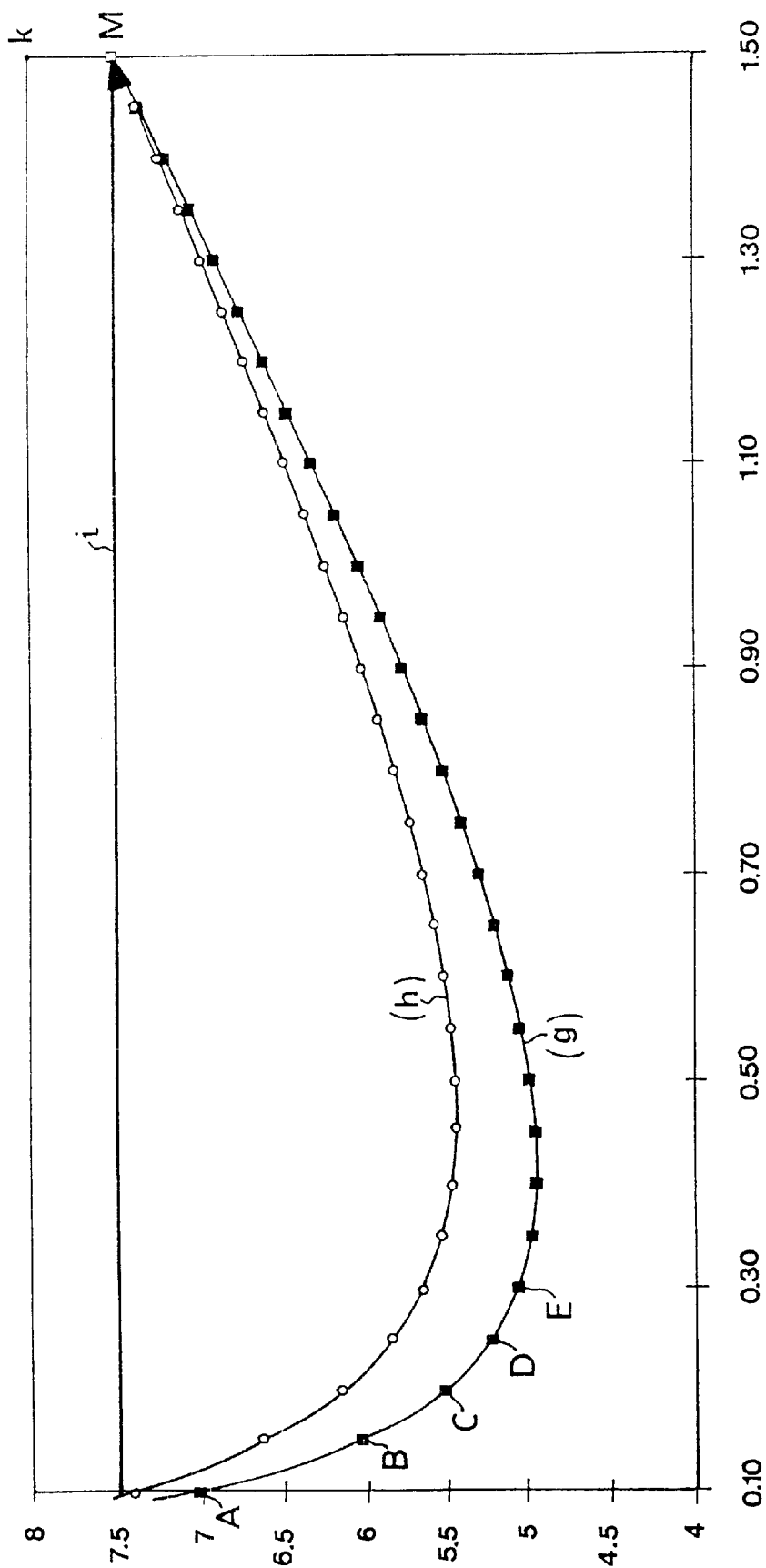
FIG. 2 represents a graph showing the change in the mass per unit area of two composite glazing materials including a selected interlayer, as a function of the thickness of the glass sheets.

Reference will now be made to FIG. 2, which shows the curves of variation in the mass per unit area, at constant rigidity, of the plastics selected in FIG. 1, as a function of the thickness of the glass sheets, the flexural rigidity being kept constant and equal to that of a monolithic glass sheet which has a given reference thickness. For example, a reference thickness of 3 mm (corresponding to a mass per unit area of 7.5 kg/m$^2$) will be chosen. To obtain this flexural rigidity an appropriate thickness of interlayer is introduced between the two glass sheets.

FIG. 2 shows the curves obtained with a polyethylene ionomer interlayer (curve g) and with a polycarbonate interlayer (curve h). Also shown in FIG. 2 is the straight line i which corresponds to the monolithic glass sheet of 3 mm thickness.

These curves have been constructed experimentally, point by point. The method of construction of one of them, for example curve g, will be explained.

A composite glazing material is manufactured including two monolithic glass sheets, each having a thickness of 0.10 mm with a polyethylene ionomer interlayer the thickness of which is such that the composite glazing material obtained has a flexural rigidity equal to that of a monolithic glass sheet of 3 mm thickness that is 160 N m. This value of the flexural rigidity is read off the curve c in FIG. 1. It corresponds to a mass per unit area of 7.5 kg/m$^2$ (since the mass per unit area of a glass sheet of 1 mm thickness is 2.5 kg/m$^2$).

The glazing material thus produced has a mass per unit area of 7 kg/m$^2$. The point A with coordinates 0.10 mm and 7 kg/m$^2$ is plotted on the system of coordinate axes in FIG. 2.

Points B, C, D, E, etc., corresponding to the thicknesses 0.15, 0.20, 0.25, 0.30 mm etc., are placed in the same way. Curve g is thus obtained. Curve h is plotted using the same process. It is seen that curves g and h pass through a minimum and through the point M with coordinates 1.50 mm, 7.5 kg/m$^2$ (absence of interlayer).

Point k, which corresponds to a glazing material which has a PVB interlayer, has also been shown in FIG. 2.

The minima in curves g and h correspond to the optimum geometric configurations. These are summarized in the following table.

TABLE 1

|  | Polyethylene ionomer | Polycarbonate | Glass | Polyvinylbutyral |
| --- | --- | --- | --- | --- |
| Optimum mass of the glazing material (kg/m$^2$) | 4.94 | 5.45 | 7.5 | 8 |
| Glass thickness (mm) | 0.4 | 0.45 | — | 1.51 |
| Interlayer thickness (mm) | 2.94 | 2.66 | — | 0.38 |
| Total thickness (mm) | 3.74 | 3.56 | 3 | 3.4 |

For example, the optimum configuration of the glazing material according to the first column of the table is:

0.4 mm glass/2.94 mm polyethylene ionomer/0.4 mm glass.

This glazing material has a total thickness of 3.74 mm and a mass per unit area of 4.94 kg/m$^2$ (0.8×2.5+1×2.94), which represents a lightening in weight of approximately 2.5 kg/m$^2$ relative to a monolithic glass glazing material of 3 mm thickness (4.94 instead of 7.5 kg/m$^2$).

It is also seen from the curves in FIG. 2 that the glass thickness varies little with the material selected. The optimum glass thickness region lies around 0.5 mm. The region included in the range 0.5±0.1 mm can be chosen if it is intended to have the benefit of the maximum lightening in weight.

If it is intended to involve other considerations in the choice of the configuration, such as the production within acceptable cost and quality conditions or the ease of assembly of the components, without, however, sacrificing too much in the lightening in weight of the glazing material, then a greater range of thickness, for example within the range 0.5±0.2 mm or even 0.5±0.7 mm may be found acceptable. In addition, the thicknesses of glass in which the plastic core is framed can be dissymmetric. In particular, in order to promote especially the sun-screening effect, using a color in the bulk of the glass, it will be possible to fit up to a thickness of 1.5 mm of glass or a face, which will be that fitted on the outer side preferably facing the sun, and to obtain the saving in weight by having on the other face only a glass thinner by 0.5 mm, or even less, up to 1.2 mm. Any glazing material according to the invention, in the case of which the sum of the glass thicknesses is smaller than 3 mm will bring a saving in weight.

These glazing materials will be manufactured especially by injecting the plastic into a mold in which the two glass sheets intended to form the external surfaces of said glazing materials will have been placed beforehand. With the glass sheets being held at the mold bottom, the injection will take place between said two glass sheets. Depending on their thickness, the two glass sheets can either be bent before being incorporated into the mold when it is a question of producing curved glazing materials, or can be placed flat in the mold and forced to espouse the walls of the mold, for example by virtue of a reduction in pressure, their curved shape being maintained when the glazing material is manufactured and when the plastic is cooled and hardened and adheres firmly to the glasses. As already said, these glazing materials will be capable of incorporating inserts, various thicknesses of plastics, each being capable in addition of contributing additional functions, for example color, radiation screening like sunscreening, etc.

What is claimed is:

1. A composite glazing material comprising two sheets of glass and a transparent plastic interlayer disposed between said two sheets of glass wherein said plastic of said plastic interlayer adheres to said glass sheets whereby a composite glazing material is formed, said glazing material having a total thickness of less than 5 mm with the proviso that said plastic interlayer has thickness greater than the thickness of said sheets of glass, the ratio of said thickness of said plastic interlayer to said thickness of said glass sheets being between 1 and 10 and said composite glazing material having a mass per unit area of less than 6 kg/m2 and a Young's modulus greater than 30 MPa at a total thickness of 3 mm.

2. A composite glazing material in accordance with claim 1 wherein said plastic of said plastic interlayer is an ionomer resin, a polyurethane, a thermoplastic polyurethane, polyethylene terephthalate, a polyester, an acrylic resin or a modified acrylic resin.

3. A composite glazing material in accordance with claim 2 wherein said ionomer resin is a copolymer of methacrylic and polyethylene or a copolymer of acrylic acid and ethylene neutralized with a polyamine.

4. A composite glazing material in accordance with claim 1 wherein said adhesion between said glass sheets and said plastic interlayer is such that the tearing resistance therebetween is at least 20 N/cm when a 1 cm width strip is employed.

5. An industrial product comprising said composite glazing material of claim 1.

6. A product in accordance with claim 5 wherein said product is selected from the group consisting of a vehicle tailgate, a bodywork component and a glazing material with frame or rims comprising a transparent zone formed of said composite glazing material and a non-transparent zone.

7. A product in accordance with claim 6 wherein said product is said glazing material with frame or rims wherein said non-transparent zone is formed of a plastic selected from the group consisting of said plastic forming said plastic interlayer and a different plastic.

8. A process of producing said product of claim 7 comprising disposing said two glass sheets of said transparent zone in bottoms of a mold and injecting said plastic of said plastic interlayer into said mold between said glass sheets.

9. A process of determining optima geometric parameters of said glazing material of claim 1, said glazing material having, at constant flexural rigidity, a mass per unit area less than that of a monolithic glazing material of the same thickness comprising:

selecting a plastic whose Young's modulus is at least 20 MPa;

laminating said plastic between two pellicular sheets of glass wherein said glazing material, having a flexural rigidity equal to a monolithic glass sheet of the same thickness, is obtained;

measuring the mass per unit area of said composite glazing material;

reproducing the above process to produce glazing materials in which pellicular glass sheets have increased thicknesses;

plotting, on a system of coordinates, values of mass per unit area for each of said glazing materials as a function of the thickness of said pellicular sheets of glass; and determining minima of the curves thus constructed.

10. A process in accordance with claim 9 wherein said monolithic glass has a reference thickness of 3 nm.

11. A glazing material comprising a laminate of two sheets of glass disposed between a plastic interlayer, said plastic of said plastic interlayer having a Young's modulus of at least 20 MPa, wherein said glazing material has a thickness ratio of said plastic interlayer to said sheets of glass in the range of 1 to 10.

12. A glazing material in accordance with claim 11 wherein said two sheets of glass have a total thickness of less than 3 mm.

13. A glazing material in accordance with claim 12 wherein said thicknesses of said glass sheets are dissymmetric, with the proviso that at least one of said glass sheets is thinner than 1.2 mm.

14. A glazing material in accordance with claim 12 wherein said two sheets of glass each have a thickness of 0.5±0.1 mm.

15. A glazing material in accordance with claim 11 wherein said two sheets of said glass each have a thickness of 0.5±0.2 mm.

16. A glazing material in accordance with claim 11 wherein said plastic of said plastic interlayer is selected from the group consisting of a polyethylene ionomer, a polycarbonate and a polyurethane.

* * * * *